United States Patent Office 3,221,764
Patented Dec. 7, 1965

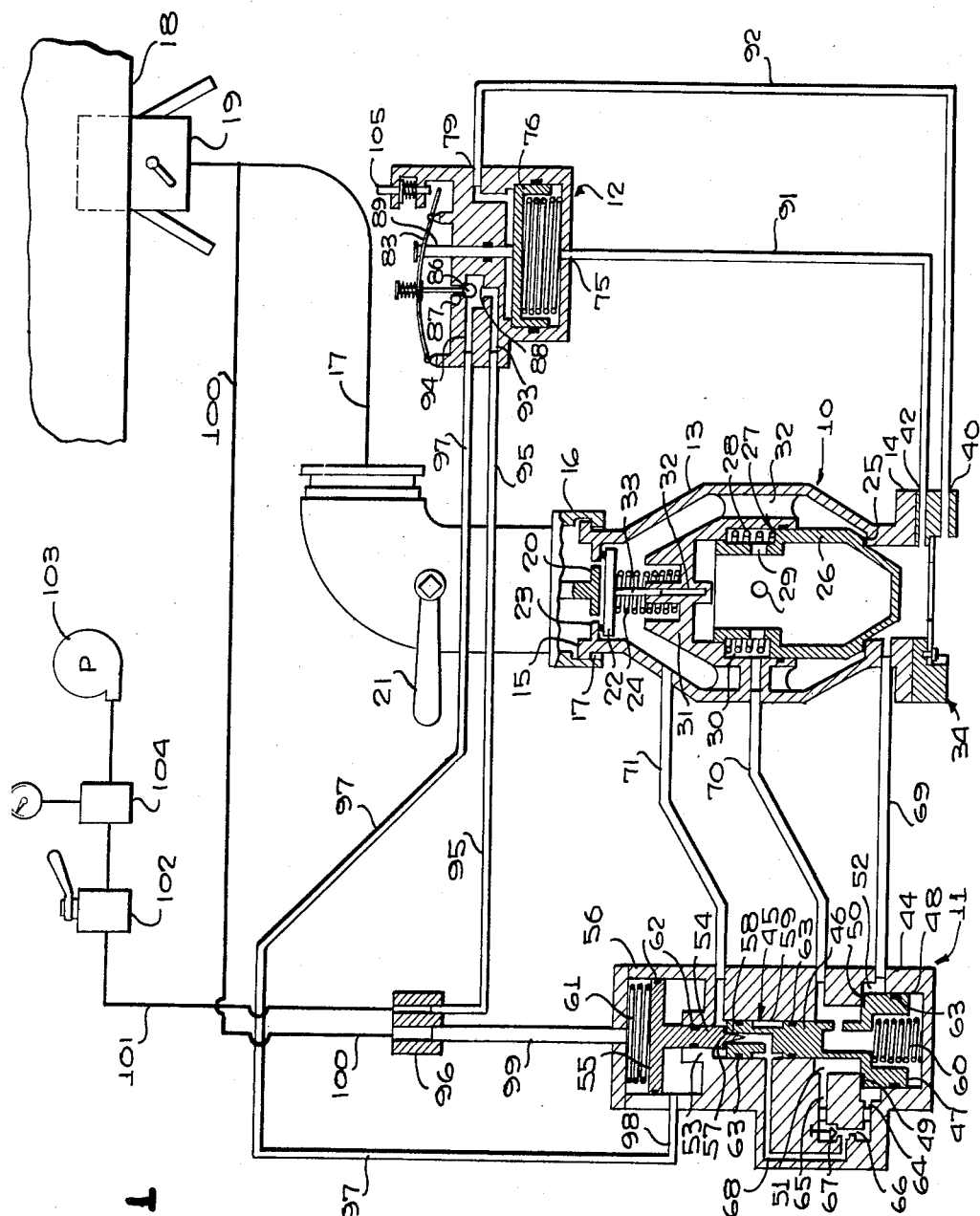

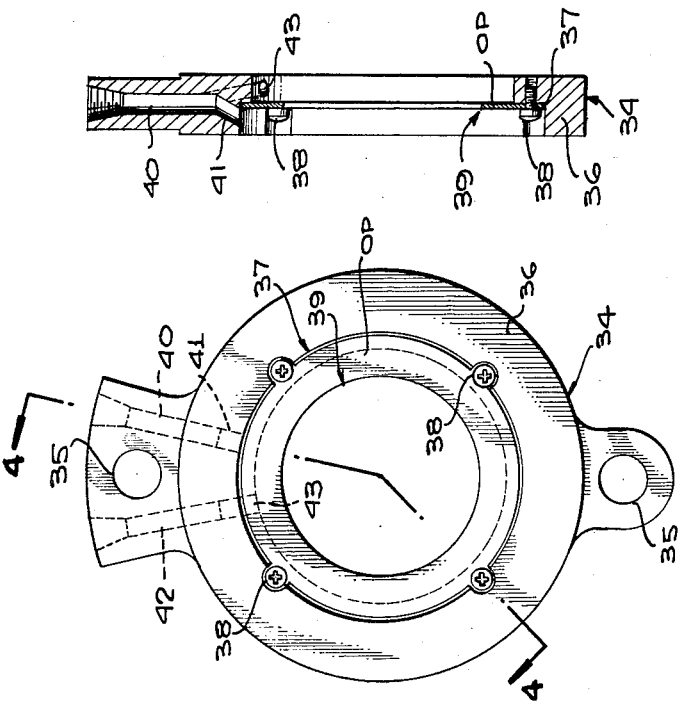
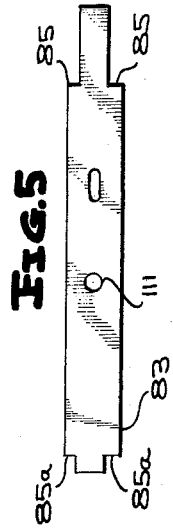
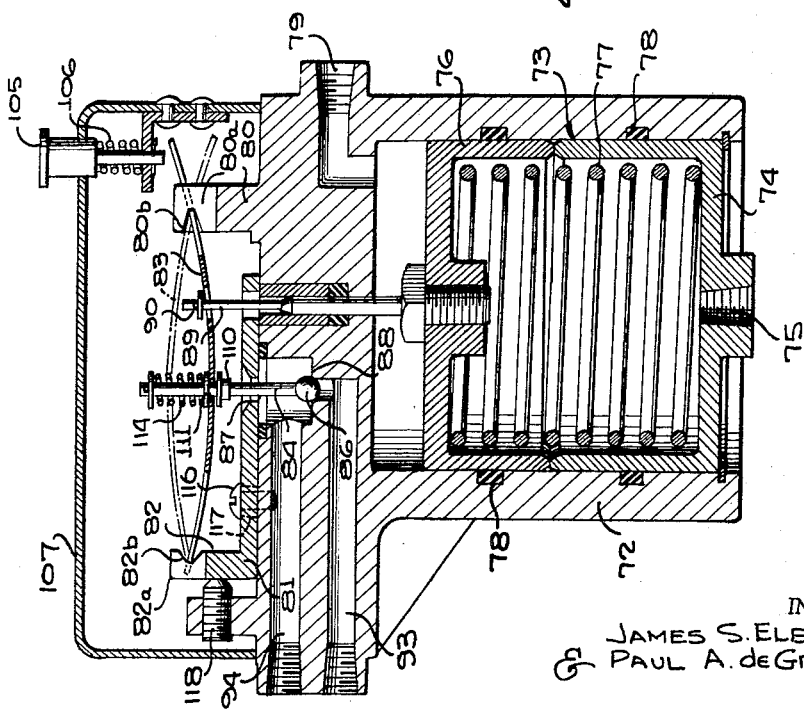
INVENTORS
JAMES S. ELBOGEN
PAUL A. deGRAAF

3,221,764
EXCESS FLOW CONTROLLED SHUT-OFF FOR PILOT CONTROLLED REGULATOR
James S. Elbogen, Encino, and Paul A. de Graaf, Los Angeles, Calif., assignors to Parker-Hannifin Corporation, Cleveland, Ohio, a corporation of Ohio
Filed Oct. 9, 1961, Ser. No. 143,677
12 Claims. (Cl. 137—460)

The invention relates generally to the fueling of planes or the controlled delivery of fuel to comparable storage facilities and it primarily seeks to provide a novel means for controlling such fuel delivery and including devices for automatically terminating the delivery upon happening of some emergent condition such as a break in the delivery hose, accidental separation of the parts, faulty coupling of the parts, or any other condition which may cause an excessive rate of fuel flow.

An object of the invention is to provide a fueling arrangement of the character stated including a pressure regulator valve having inlet means for connection with the fuel supply, and outlet means for connection with devices for delivering the fuel to a place of storage, and novel servo control devices effective to automatically close the regulator valve and discontinue the delivery of fuel whenever the rate of fuel flow to the regulator valve exceeds a predetermined maximum.

It is another object to provide an apparatus including a pilot valve controlled pressure regulator and a servo valve responsive to fluid pressure conditions brought about by excess flow to cause operation of the pilot valve in such manner that the pressure regulator is caused to close.

Another object of the invention is to provide a novel fueling arrangement of the character stated wherein an orifice plate means is provided at the inlet into the pressure regulator, and wherein there is included a servo means ineffective so long as the pressure differential between opposite sides of the orifice plate is less than a predetermined maximum, but effective whenever the predetermined maximum differential is exceeded to bring about a closing of the regulator valve and discontinuance of fuel delivery.

Another object of the invention is to provide a novel fuel feeding arrangement of the character stated wherein the orifice plate arrangement at the regulator valve inlet has pressure connection with its controlled servo means, the servo means including a piston movable upon a predetermined differential pressure condition at opposite sides thereof for closing a control valve and bringing about the desired closing of the regulator valve, there being included individual pressure lines connecting the regulator valve inlet upstream and downstream of the orifice plate respectively with the opposite sides of said piston.

A further object of the invention is to provide a novel arrangement of the character stated wherein the valve of the orifice plate controlled servo means is moved by a bowed snap spring, the snap spring being moved in one direction by movement of the servo piston, and in the opposite direction by a manually operable re-set button.

A still further object of the invention is to provide a novel orifice plate unit including a mounting plate having a fuel passage therethrough, an orifice plate traversing and restricting the passage through the mounting plate, a low pressure port for connection with a low pressure duct and opening into the mounting plate passage on the downstream side of the orifice plate, and a high pressure port for connection with a high pressure duct and opening into the mounting plate passage on the upstream side of the orifice plate.

With the above and other objects in view that will hereinafter appear, the nature of the invention will be more clearly understood by reference to the following detailed description, the appended claims and the several views illustrated in the accompanying drawings.

In the drawings:
FIG. 1 is a schematic sectional view illustrating the invention, the excess flow shut-off servo being shown in the normal, valve open position, the regulator servo piston being shown in the poppet needle closing position and the main valve in the regulator being shown in its seated or closed position.
FIG. 2 is an enlarged detail sectional view illustrating the excess flow shut-off servo in its valve seated condition.
FIG. 3 is a plan view of the orifice plate.
FIG. 4 is a vertical cross section taken on the line 4—4 on FIG. 3.
FIG. 5 is a plan view of the snap spring for the excess flow servo valve.

The control part arrangement of the invention illustrated schematically in FIGURE 1, includes a main valve section generally designated 10, a pilot or servo valve section generally designated 11, and an excess flow shut-off servo section generally designated 12. The regulator 10 includes a housing 13 having a flange 14 at one end thereof for attachment to a source of supply. At the other end, the housing has attached to it an adaptor fitting 15 for connection with a coupler schematically indicated at 16, bayonet lugs 17 being provided for this purpose. The coupler is in turn schematically indicated as attached to a conduit 17 through which fluid may be delivered to the receiving tank 18 through the usual quick detachable nozzle means indicated at 19.

The coupler 16 may be of any suitable form, but preferably of the type shown in FIG. 2 of the Davies Patent 2,630,822 and includes a coupler valve 20 for opening and closing the coupler through manual actuation of the handle 21. In such case, a poppet valve 22 is provided within the regulator housing 13 for closing the outlet port 23, said poppet valve 22 being normally closed against its seat by a spring 24. Poppet valve will be unseated by the projection of the valve 20 when the couple is completed and the handle 21 is manipulated to open communication through the regulator outlet into the fluid delivery line 17.

At the inlet end of the regulator housing 13, there is provided a seat 25 against which the main valve 26 is engageable, said valve being slidably mounted in the housing at 27 and constantly urged toward its seat by spring means 28. Ports 29 open to the interior of the main valve 26 from a surrounding pressure chamber 30 forming a part of the slideway in which the main valve is mounted, said chamber and slideway being provided in a sleeve or shell-like body 31 supported in spaced relation within the housing 13 on suitable webbing 32. It will be noted that the body 31 serves as a mounting for the poppet seating spring 24, and also provides guide means at 32 for the poppet valve stem 33.

At the entrance end or lower portion of the regulator housing 13 an orifice plate assembly generally designated 34 is mounted as at 35. This assembly includes a supporting plate 36 which is recessed at 37 to receive the orifice plate or ring OP which is removably mounted at 38 and presents a restricted orifice or inlet opening 39. A high pressure port is formed radially in the plate at 40 and opens through an angular extension 41 into the interior of the plate opening above the orifice plate as indicated in full lines in FIGURE 4 and a low pressure port 42 is formed radially in the plate 36 and opens through an angular extension 43 into the interior of the plate below the orifice plate as indicated in dotted lines in FIGURES 3 and 4 of the drawings.

The pilot or servo valve section includes a housing 44 having a bore 45 therein wherein the plunger 46 projecting from a fast closing servo piston 47 is reciprocable, said piston being slidable in a counterbore 48 and having thereon a seat ring 49 engageable with the seat 50 provided by the counterbore 48. Between the bore 45 and the counterbore 48 a counterbore 51 is provided, the same providing a flow chamber about the plunger 46 above the piston 47 and the housing 44 also is provided with an annular chamber 52 providing a flow chamber about the upper portion of the piston 47.

At its upper end, the housing 44 is provided with a guide or bore 53 wherein a plunger 54 is slidable, the same depending from a regulator servo piston 55 which is reciprocable in a cylinder portion 56 of the housing 44 and carries a needle valve 57 at its lower end extremity. The needle projection 57 on the regulator servo piston plunger projection 54 seats in an axial bore 58 opening through the upper end of the fast closing servo piston plunger 46, and radially outward into an annular clearance 59 in the exterior of said plunger 46.

The fast closing servo piston 47 is constantly urged toward its seat by a spring means 60 of predetermined value and the regulator servo piston 54 is constantly urged toward its needle projection seating position by spring means 61 of predetermined value, their purposes to be described in detail hereinafter. It is also to be noted that the regulator servo piston 55 and plunger projection 54 are suitably sealed at 62, and the fast closing servo piston 47 and its plunger projection 46 are suitably sealed at 63.

Within the housing 44, the annular chamber 52 surrounding the fast closing servo piston and the annular chamber 51 surrounding the plunger 46 are connected by communicating screened ducts 64 and 65, the former having a choked outlet at 66, and the latter having an adjustable needle valve control choke at 67. A ducting 68 communicates with the chamber forming clearance 59 about the piston plunger projection 46 and with the ducts 64 and 66 at a point between the chokes or bleed points 66 and 67, as clearly illustrated in FIGURE 1 of the drawings.

It will be apparent by reference to FIGURES 1 and 2 that the chamber 52 surrounding the fast closing servo piston is connected by a duct 69 with the regulator housing at a point just below the main valve seat 25. It will also be apparent that chamber 51 communicates through a duct 70 with the previously mentioned chamber 30 in the regulator, and the plunger bore 45 at the location of the regulator servo piston carried needle 57 is connected by a duct 71 with the interior of the regulator housing 13 adjacent the upper or outlet end thereof.

The excess flow shut-off servo generally designated 12 includes a casing 72 providing a cylindrical chamber 73 closed by a cup-like closure 74 having a low pressure port at 75. A piston 76 is reciprocable in the cylinder 73 and is constantly urged to a raised position by a spring means 77 interposed between the piston and the closure 74. The piston and the closure are suitably sealed at 78. The casing also is equipped with a high pressure port 79 opening into the cylinder 73 above the piston 76.

A support 80, having forks at 80a with notches 80b, rises from the casing 72 and cooperates with an adjustably mounted member 81, having a standard 82 similarly forked and notched at 82a and 82b, in supporting a snap leaf spring 83 on which a ball valve carrier 84 is mounted. As shown in FIG. 5, snap spring 83 is reduced in width on each end to provide shoulders 85 and 85a for engaging the notches in supports 80 and 82 respectively. The carrier 84 carries a ball valve 86 at its lower end extremity in position for seating upwardly against a vent closing seat 87 or downwardly against a pressure cutoff seat 88. The normal position of the spring 83 is shown in FIGURE 1 of the drawing, or in other words in the position for presenting the valve 86 in its pressure open, vent closing position.

An actuator pin 89 projects upwardly from the piston 76 and has an actuator portion 90 overlying the leaf spring 83 so that whenever the piston 76 is depressed it will snap the leaf spring downwardly to remove the ball valve 86 from its vent closing position shown in FIGURE 1 and place it in its pressure cut-off position shown in FIGURE 2.

The low pressure port 75 of the excess flow shut-off servo is connected by a duct 91 with the low pressure outlet 42 of the orifice plate and the high pressure port 79 of said servo is connected by a duct 92 with the high pressure outlet 40 of said orifice plate.

The casing 72 has a pressure inlet port 93 opening through the ball seat 88, and a pressure outlet port 94 which is closed to pressure when the ball is seated on seat 88. There is an inlet duct 95 leading from connector means 96 to the inlet port 93, and an outlet duct 97 which connects the outlet port 94 with the pilot or servo valve section cylinder 56 at 98, or in other words at a point beneath the piston 55. The cylinder 56 is connected above the piston 55 by a duct connection 99 with the connector means 96, and therethrough at 100 with the delivery line 17 downstream of the regulator or main valve 10. The inlet duct 95 connects with the connector means 96 and therethrough at 101 with a manual control valve 102 which in turn connects with a source of actuator or reference air pressure 103 through a pressure regulator 104.

A re-set button 105 is provided on the excess flow shut-off servo means, said button being spring projected at 106 to a readily accessible position without the protective housing 107.

Ball valve carrier 84 has an enlargement 110. The portion of the carrier above the enlargement projects through an opening 111 in snap spring 83. Loosely fitting washers 112 and 113 are on opposite sides of the snap spring, washer 112 butting against enlargement 110 and washer 113 being pressed by spring 114 against the snap spring.

To provide for setting and/or adjusting the throw of snap spring 83 and hence the seating pressure which will be applied to ball valve 86, member 81 is adjustably mounted. Normally member 81 is held in a fixed position by screws 116, one of which is shown in FIG. 2, the screws passing through elongated slots 117 in member 81. To set or adjust the throw of snap spring 83, screws 116 are loosened and screw 118 is turned to increase or decrease the bowing of the snap spring by moving member 81 toward or away from notched support 80 to thus adjust the seating pressure of ball 86 on seat 88. Screws 116 are then tightened to lock member 81 in place.

It is to be understood that the excess flow shut-off servo is in its normal condition when its piston 76 is in its raised position and the control ball valve 86 is in its raised position closing off vent port 87 and opening valve seat 88 to provide communication through the service or actuating pressure lines or ducts 95 and 97.

It is to be understood also that the piston 47 in the pilot or servo valve means engages on the seat 50 on a diameter the same as or slightly less than the outer diameter of the seating ring or packing 49 so that the piston 47 is substantially balanced, or slightly overbalanced in a seating direction by pressure of fluid beneath said piston entering through duct 69, chamber 52, ducts 66 and 65, and the ported and hollow lower portion of the piston plunger 46.

Assume that it is now desired to supply fluid, or in other words fuel, to the tank 18, and that the nozzle 19 has been properly attached to the tank and the coupler 16 with its hose connection 17 to the nozzle 19 has been properly attached to the regulator 10 so that manipulation of the handle 21 opens valve 22 of the regulator. It will be assumed also that the entrant end 14 of the regulator is suitably connected with a source of fuel (not shown) at a point below orifice plate assembly 34.

At this time, the main valve 26 of the regulator is closed due to the action of the spring 30, needle valve 57 is closed by spring 61, and the piston 47 is seated on the seat 50 by the spring 60. Fluid in the inlet port beneath the seated main valve 26 passes through the duct 69, chamber 52 orifice or choke 66, needle valve control choke 67, chamber 51 and duct 70 into the pressure chamber 30 within the regulator. Since the needle valve 57 is seated or closed, the fluid is trapped within the chamber 30 and in the interior of the main valve 26 and exerts a downward pressure on the valve 26 on a greater area than is acted upon by the fuel beneath the valve 26, thereby to hold the main valve in its seated condition.

To start the flow of fuel, the operator manipulates the valve 102 so that the reference air pressure, regulated at 104, is directed into the inlet line or duct 95 and past the unseated ball valve 86 into the outlet line or duct 97 and into the chamber beneath the regulator servo piston 55. It is to be understood that the valve 102 is in the nature of a "dead man" control in that it must be manually held to an open position in order for the fueling operation to continue. Any time this lever is released, closing of the main valve will be brought about automatically.

The air pressure thus directed upwardly against the regulator servo piston 55 lifts the needle valve 57 to open the communication between the ducts 68 and 71 and thereby relieve pressure from the chamber 30 within the regulator and the main valve 26 therein into the lower pressure outlet from the regulator housing 13. This release of pressure is at a greater rate than the rate at which pressure can re-enter the chamber 30 through the connections 69, 52, 64, 66, and thus the pressure tending to lift or open the main valve 26 becomes dominant and said main valve is opened and fuel entering the regulator housing 13 will pass about the shell-like body 31 and out past the unseated poppet valve 22.

As delivery pressure builds up in the delivery line or conduit 17, fuel pressure in the chamber above the regulator servo piston 55 will approach the desired regulated pressure predetermined by the pressure regulator 104. As the desired regulated pressure is thus attained, the piston 55 and the needle valve 57 carried thereby are forced downward to throttle the bleed-away flow from the chamber 30. This causes pressure within the chamber 30 and within the interior of the main valve 26 to build up and start closing movement of the valve 26 with consequent throttling of the flow through the main housing 13 toward the receiving tank 18. At some point of throttled flow, the pressure in the chamber above the regulator servo piston 55 will counterbalance the fixed air pressure within the chamber below said piston to stabilize the positions of the needle valve 57 and the valve 26 so as to maintain the desired regulated delivery pressure in the nozzle 19.

It is customary to provide means for automatically cutting off the flow when the tank 18 has been filled, this being accomplished by means not shown and forming no part of the present invention. When this occurs, it causes the pressure in delivery line 17 to increase and also to bring about an increase of pressure in the chamber above the regulator servo piston 55. This causes the needle valve 57 to be depressed and close off the exhausting of pressure from the regulator chamber 30 into the lower pressure outlet of said regulator, and the resultant building up of pressure within the chamber 30 and the interior of the valve 26 brings about a returning of the valve 26 to its seated condition.

The piston valve 47 serves as a means for directing flow from the inlet immediately beneath the main valve 26 to the regulator chamber 30 and the interior of the main valve 26 for rapidly filling the same and bringing about a quick closing of the main valve 26 upon closing of the needle valve 57, or upon sudden increase in the delivery pressure at the tank 18. In either case, the increase of pressure at the tank 18 will be reflected back through the line 17 where it will cause rapid increase in the chamber of the cylinder 56 immediately above the regulator and servo piston 55. This will cause the needle valve carrying piston projection 57 to move to the needle valve closing position and then continue on to force the piston plunger projection 46 downwardly, thereby unseating the piston valve 47 on its seat 50. With the piston valve thus unseated, fluid from the regulator inlet beneath the main valve 26 will pass through duct 69, chamber 52 and directly through the chamber 51 and duct 70 into the regulator chamber 30 and the interior of the hollow valve 26 to bring about a quick seating of said hollow valve.

A feature of the present arrangement as schematically shown in FIGURE 1 is that the main valve in opening is controlled to have a gradual opening. When air pressure is applied to the servo unit by opening of the valve 102 as aforesaid, the regulator servo poppet 54 opens allowing pressure from the main valve chamber 30 to be bled downstream through 71 through the servo section 11 in the manner described, thus allowing the main valve to open slowly as determined by the needle valve choke at 67. As previously stated, the downstream regulated pressure is set by adjusting the actuating or reference pressure and maintaining the same at the regulator 104. The normal controlling of a fueling operation is carried on in the manner previously described.

Opening 39 in orifice plate OP provides a slight restriction of inlet flow to regulator valve 10 and thus pressure of fluid on the upstream side of the plate will be higher than the pressure of fluid on the downstream side while fluid is flowing and the faster the flow the greater the differential in such pressures. When the differential reaches a predetermined amount corresponding to a predetermined flow rate which is considered to be excessive, the said differential brings about shifting of the excess flow servo valve 12 to close air reference pressure duct 95 and open duct 97 to vent with resultant closing of servo valve 54 and main valve 26.

In the normal condition of the parts, the ball valve 86 is in its lifted position closing the exhaust or venting port at 87 and opening communication between the ducts 95 and 97 at seat 88. As fluid flows through the orifice plate OP the pressure downstream thereof is presented to the lower side of piston 76 through conduit 91 and the pressure on the upstream side thereof is presented to the upper side of the piston through conduit 92. As the flow rate through the orifice plate OP increases, the pressure differential across the piston 76 in the excess flow shut-off servo increases. When the flow rate reaches the predetermined cut-off point, the pressure differential across the piston 76 overcomes the spring 77 and the piston is moved downwardly, snapping the leaf spring 83 downwardly to bring about a seating of the ball 86 at 88 and closing off communication from the service pressure source through 95 and 97 to the cylinder 56 beneath the regulator servo piston 55 and venting air on the lower side of piston 55 to atmosphere through conduit 97 and vent port 87. This causes closing of servo valve 54 pressure regulator or main valve 26, discontinuing the infeeding of fuel. The normal position of snap spring 83 can be restored only by manual depression of the re-set button 105 and the resulting opening of the ball valve 86 by the snapping upwardly of the leaf spring 83.

As evident from FIG. 4, orifice plate OP is replaceably mounted in member 36. If it is desired to increase or decrease the flow rate which will cause operation of the excess flow servo valve 12 for shutting off flow of fuel, plate OP may be removed and replaced by another plate having a larger or smaller opening 39 as necessary.

While a preferred structure and arrangement of parts adapted for practicing the invention have been disclosed herein it is to be understood that changes in structure and arrangement of such parts may be made without departing from the scope of the invention as defined in the appended claims.

We claim:

1. An apparatus for controlling the flow of a liquid, a flow regulator having a main flow passage with an inlet and an outlet and having a fluid pressure operated main valve for opening and closing said main passage, said regulator having a pressure chamber connected to said inlet, a bleed passage connected to said pressure chamber and effective when closed to trap pressure fluid in said chamber for closing said main valve and effective when open to relieve pressure in said chamber for permitting inlet pressure to open said main valve, a first servo valve including operating means for opening and closing said bleed passage, the operating means of said first servo valve being actuable to open and close positions, a separate source of regulating fluid, a second servo valve including operating means for directing the regulating fluid from said source to the operating means of said first servo valve for moving the same in a direction for opening said first servo valve, second means for applying a counteracting force to the operating means of the first servo valve for closing said first servo valve, said second servo valve including means responsive to a rate of liquid flow through the regulator greater than the predetermined rate for closing off the supply of the regulating fluid to the operating means of the first servo valve whereby said second means will close said first servo valve.

2. Apparatus in accordance with claim 1 including means for creating zones of relatively low and high pressure on the inlet side of said main valve, and means placing said zone creating means in fluid communication with the means of the second servo valve responsive to liquid flow rate through the regulator.

3. Apparatus in accordance with claim 2 in which said zone creating means comprises a flow restrictor and said zones are on opposite sides of said restrictor.

4. Apparatus in accordance with claim 3 in which said flow restrictor is an orifice plate unit including a mounting plate having a fuel passage therethrough and said orifice plate traversing the opening and restricting the passage through the mounting plate.

5. Apparatus in accordance with claim 1 including manually actuable means for controlling the flow of regulating fluid through said second servo valve to said first servo valve, and said manually actuable means and the responsive means of the second servo valve are in series whereby closing off flow of said fluid by either closes off the supply of said fluid to said first servo valve.

6. In apparatus for controlling the flow of a liquid, a flow regulator having a main flow passage with an inlet and an outlet and having a fluid pressure operated main valve for opening and closing said main passage, said regulator having a pressure chamber connected to said inlet, a bleed passage connected to said pressure chamber and effective when closed to trap pressure fluid in said chamber for closing said main valve and effective when open to relieve pressure in said chamber for permitting inlet pressure to open said main valve, a servo valve for opening and closing said bleed passage, said servo valve being actuable to open and closed positions by a piston, first means for directing regulating fluid to one side of said piston for moving the same in a direction for opening said servo valve, second means for applying a force to the piston in a direction for closing said servo valve, third means responsive to a rate of liquid flow through said regulator greater than a predetermined rate for closing off the supply of said fluid to said one side of said piston and for venting said one side whereby said second means will close said servo valve.

7. Apparatus in accordance with claim 6 in which said third means comprises a three way valve.

8. Apparatus in accordance with claim 6 in which said third means includes a valve member normally pressed by a spring to a first position in which it permits flow of said fluid to said one side of said piston and actuable by fluid pressure responsive means to a second position for closing off flow of said fluid to said one side of said piston.

9. Apparatus in accordance with claim 8 in which said spring is an over-center type so as to be normally ineffective for moving the valve member to said first position after operation to said second position.

10. Apparatus in accordance with claim 8 in which said spring is an over-center type and there is a manual reset means for returning said valve member to said first position after operation to said second position.

11. Apparatus in accordance with claim 8 in which said spring is in the form of a bowed leaf having a first over-center position for maintaining said valve member in said first position and which is snapped to a second over-center position by said fluid pressure responsive means for maintaining said valve member in said second position.

12. In apparatus for controlling the flow of a liquid, a pressure regulator having a main flow passage with an inlet and an outlet and having a fluid pressure operated main valve for opening and closing said main passage, said regulator having a pressure chamber connected to said inlet, a bleed passage connected to said pressure chamber and effective when closed to trap pressure fluid in said chamber for closing said main valve and effective when open to relieve pressure in said chamber for permitting inlet pressure to open said main valve, a servo valve for opening and closing said bleed passage, said servo valve being actuable to open and closed positions by a piston, first means for directing regulating fluid to one side of said piston for moving the same in a direction for opening said servo valve, second means directing liquid from said main flow passage downstream of said main valve to the piston in a direction for closing said servo valve, third means responsive to a rate of liquid flow through said regulator greater than a predetermined rate for closing off the supply of said fluid to said one side of said piston and for venting said one side whereby said second means will close said servo valve.

References Cited by the Examiner

UNITED STATES PATENTS

| | | | |
|---|---|---|---|
| 2,266,533 | 12/1941 | Brisbane et al. | 137—460 |
| 2,649,773 | 8/1953 | Griswold | 137—460 |
| 2,707,484 | 5/1955 | Rush | 137—460 |
| 2,771,905 | 11/1956 | Griswold | 137—489 XR |
| 2,798,689 | 7/1957 | Houghton | 251—75 |
| 2,842,962 | 7/1958 | Dall | 73—211 |
| 2,865,594 | 12/1958 | Winfree | 251—75 |
| 2,888,032 | 5/1959 | Griswold | 137—486 |
| 2,923,316 | 2/1960 | Paul et al. | 137—489.3 |
| 3,026,727 | 3/1962 | Spurling | 73—211 |
| 3,136,333 | 6/1964 | Griswold | 137—489 |

M. CARY NELSON, *Primary Examiner.*

MARTIN P. SCHWADRON, *Examiner.*